(12) United States Patent
Tsukada

(10) Patent No.: US 9,421,970 B2
(45) Date of Patent: Aug. 23, 2016

(54) STOP CONTROL APPARATUS FOR INTERNAL COMBUSTION ENGINE

(75) Inventor: Yuta Tsukada, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/363,348

(22) PCT Filed: Dec. 14, 2011

(86) PCT No.: PCT/JP2011/078914
§ 371 (c)(1),
(2), (4) Date: Jun. 6, 2014

(87) PCT Pub. No.: WO2013/088526
PCT Pub. Date: Jun. 20, 2013

(65) Prior Publication Data
US 2014/0330476 A1    Nov. 6, 2014

(51) Int. Cl.
*B60W 20/00* (2016.01)
*B60K 6/445* (2007.10)
*B60W 10/06* (2006.01)
*B60W 10/08* (2006.01)
*F02D 17/00* (2006.01)
*F02N 11/08* (2006.01)

(52) U.S. Cl.
CPC .............. *B60W 20/40* (2013.01); *B60K 6/445* (2013.01); *B60W 10/06* (2013.01); *B60W 10/08* (2013.01); *F02D 17/00* (2013.01); *F02N 11/0833* (2013.01); *B60W 2510/0685* (2013.01);
(Continued)

(58) Field of Classification Search
CPC ..... B60W 20/40; B60W 10/08; B60W 10/06; B60K 6/445; F02D 17/00; F02N 11/0833

USPC .......................................................... 701/22
See application file for complete search history.

(56) References Cited

U.S. PATENT DOCUMENTS 5,595,161 A  * 1/1997  Ott et al. .................. 123/491
7,142,973 B2 * 11/2006  Ando ....................... 701/112
(Continued)

FOREIGN PATENT DOCUMENTS

| CN | 1573087 A | 2/2005 |
|----|-----------|--------|
| JP | 2002-54480 | 2/2002 |

(Continued)

*Primary Examiner* — Michael Berns
(74) *Attorney, Agent, or Firm* — Finnegan, Henderson, Farabow, Garrett & Dunner, LLP

(57) ABSTRACT

A stop control apparatus for an internal combustion engine is provided with: a motor (MG1) configured to output torque to a crankshaft (205) of the internal combustion engine (200); a number-of-revolutions detecting device (110) configured to detect the number of revolutions of the internal combustion engine; a crank angle detecting device (120) configured to detect a crank angle of the crankshaft of the internal combustion engine; a motor controlling device (150) configured to control the motor to output adjusting torque which adjusts the crank angle when the internal combustion engine stops to have a desired value, when the internal combustion engine stops; a throttle valve controlling device (160) configured to control an opening degree of a throttle valve (208) to be a predetermined opening degree in an intake stroke immediately before the internal combustion engine stops; and an adjusting torque determining device (140) configured, to determine the adjusting torque on the basis of the predetermined opening degree and the crank angle when the number of revolutions of the internal combustion engine has a predetermined value. This makes it possible to preferably control the crank angle when the internal combustion engine stops.

4 Claims, 11 Drawing Sheets

(52) U.S. Cl.
CPC ..... *B60W2710/0605* (2013.01); *Y02T 10/6239* (2013.01); *Y02T 10/6286* (2013.01); *Y10S 903/93* (2013.01)

(56) References Cited

U.S. PATENT DOCUMENTS

| | | | |
|---|---|---|---|
| 7,228,209 B2 | 6/2007 | Izawa et al. | |
| 8,099,998 B2 * | 1/2012 | Muller | 73/114.26 |
| 2010/0300414 A1 * | 12/2010 | Pursifull et al. | 123/559.1 |
| 2011/0208411 A1 | 8/2011 | Tsuji et al. | |

FOREIGN PATENT DOCUMENTS

| | | |
|---|---|---|
| JP | 2004-232539 | 8/2004 |
| JP | 2007-327364 | 12/2007 |
| JP | 2008-13041 | 1/2008 |
| JP | 2008-763792 A | 7/2008 |
| JP | 2009-234364 A | 10/2009 |
| JP | 2010-116833 | 5/2010 |

\* cited by examiner

MG1 number of revolutions

MG1 number of revolutions

STOP CONTROL APPARATUS FOR INTERNAL COMBUSTION ENGINE

CROSS-REFERENCE TO RELATED APPLICATIONS

This application is a national phase application of International Application No. PCT/JP2011/078914, filed Dec. 14, 2011, the content of which is incorporated herein by reference.

TECHNICAL FIELD

The present invention relates to a stop control apparatus for an internal combustion engine configured to control a stop operation of the internal combustion engine installed in a vehicle such as, for example, an automobile.

BACKGROUND ART

This type of internal combustion engine is required to perform such control that a crank angle when the engine stops is within a predetermined range, for example, in order to suppress vibration when starting the engine. For the control of the crank angle, for example, a method of increasing a throttle opening degree immediately before the stop of the internal combustion engine is used. For example, it is proposed in Patent document 1 that the variation of the crank angle when the engine stops is reduced by increasing the throttle opening degree in an intake stroke immediately before the stop of the internal combustion engine and by increasing compression pressure in a compression stroke. For example, it is also proposed in Patent document 2 that the throttle opening degree in stop control is determined in accordance with the crank angle when the number of revolutions of the internal combustion engine is a predetermined value. It is also proposed in Patent document 3 that the throttle opening degree in stop control is determined in accordance with intake air density of the internal combustion engine.

PRIOR ART DOCUMENT

Patent Document

Patent document 1: Japanese Patent Application Laid Open No. 2004-232539
Patent document 2: Japanese Patent Application Laid Open No, 2010-116833
Patent document 3: Japanese Patent Application Laid Open No, 2007-327364

SUMMARY OF INVENTION

Subject to be Solved by the Invention

As described in the Patent documents 1 to 3 described above, in the method, of increasing the throttle opening degree, a piston in the intake stroke is braked due to intake negative pressure. Here, in the case of a four-or-more cylinder internal combustion engine, since any of the cylinders is always in the intake stroke, is a braking effect due to the intake negative pressure becomes constant and the crank angle is easily controlled. In the case of a three-or-less cylinder internal combustion engine, however, since there can be a time in which none of the cylinders is in the intake stroke, the braking effect due to the intake negative pressure does not become constant, and the crank angle is hardly controlled. In other words, in the technologies described in the Patent documents 1 to 3 described above, there is such a technical problem that it is likely difficult to control the crank angle due to the generation of the intake negative pressure.

In view of the aforementioned problems, it is therefore an object of the present invention to provide a stop control apparatus for an internal combustion engine configured to preferably control the crank angle when the engine stops, even in the case of the three-or-less cylinder internal combustion engine.

Means for Solving the Subject

The above object of the present invention can be achieved by a stop control apparatus for an internal combustion engine is provided with: a motor configured to output torque to a crankshaft of the internal combustion engine; a number-of-revolutions detecting device configured to detect the number of revolutions of the internal combustion engine; a crank angle detecting device configured to detect a crank angle of the crankshaft of the internal combustion engine; a motor controlling device configured to control the motor to output adjusting torque which adjusts the crank angle when the internal combustion engine stops to have a desired value, when the internal combustion engine stops a throttle valve controlling device configured to control an opening degree of a throttle valve to be a predetermined opening degree in an intake stroke immediately before the internal combustion engine stops; and an adjusting torque determining device configured to determine the adjusting torque on the basis of the predetermined opening degree and the crank angle when the number of revolutions of the internal combustion engine has a predetermined value.

The stop control apparatus for the internal combustion engine of the present invention controls the operation of the three-or-less cylinder internal combustion engine when the internal combustion engine stops. The internal combustion engine of the present invention is configured, for example, as a power element which can supply power to a drive shaft of a vehicle, and can adopt various aspects regardless of, for example, a fuel type, a fuel supply aspect, a fuel combustion aspect, a configuration of an intake/exhaust system, cylinder arrangement and the like.

The stop control apparatus for the internal combustion engine of the present invention is provided with the motor configured to output the torque to the crankshaft of the internal combustion engine. The motor is configured as a motor generator such as, for example, a motor generator mounted on a hybrid vehicle. The stop control apparatus for the internal combustion engine of the present invention is also provided with the number-of-revolutions detecting device configured to detect the number of revolutions of the internal combustion engine, and the crank angle detecting device configured to detect the crank angle of the crankshaft of the internal combustion engine.

According to the stop control apparatus for the internal combustion engine of the present invention, the stop control of the internal combustion engine is started if the number of revolutions of the internal combustion engine detected on the number-of-revolutions detecting device is less than or equal to a predetermined threshold value. In the stop control of the internal combustion engine, for example, reducing torque for reducing the number of revolutions of the internal combustion engine is outputted from the motor. This gradually reduces the number of revolutions of the internal combustion engine, and eventually stops the internal combustion engine.

Here, particularly in the present invention, in the stop control of the internal combustion engine, the motor is controlled by the motor controlling device to output the adjusting torque for setting the crank angle when the internal combustion engine stops to have the desired value. If the motor outputs the aforementioned reducing torque, the sum of the reducing torque and the adjusting torque is outputted from the motor.

Moreover, in the present invention, in addition to the output of the adjusting torque described above, the opening degree of the throttle valve is controlled by the throttle valve controlling device to be a predetermined opening degree in the intake stroke immediately before the internal combustion engine stops. This reduces the intake negative pressure of an intake manifold in the intake stroke. In other words, the "predetermined opening degree" herein is obtained and set in advance, theoretically, experimentally, or experientially, as a value that can reduce the intake negative pressure.

The reduction in the intake negative pressure as described above reduces the braking effect of the piston due to the negative pressure in the intake stroke, and increases the other braking effect in the compression pressure. This makes it easy to stop the crank angle in a state of the compression stroke (preferably, immediately before top dead center in which vibration at the start of the internal combustion engine can be effectively suppressed).

Moreover in the present invention, the aforementioned adjusting torque is determined on the basis of the predetermined opening degree of the throttle valve and the crank angle when the number of revolutions of the internal combustion engine has the predetermined value. By determining the adjusting torque in this manner, the accuracy of the crank angle when the internal combustion engine stops can be further increased.

In the case of the four-or-more cylinder internal combustion engine, any of the cylinders is always in the intake stroke. Thus, even if the adjusting torque is not outputted, the braking effect due to the intake negative pressure becomes constant, and the crank angle is easily controlled. In the case of the three-or-less cylinder internal combustion engine as described in the present invention, however, there can be a period in which none of the cylinders is in the intake stroke. Thus, the braking effect due to the intake negative pressure does not become constant, and the crank angle is hardly controlled. Therefore, the present invention in which the opening degree of the throttle valve is controlled while the adjusting torque is outputted is extremely useful in practice.

As explained above, according to the stop control apparatus for the internal combustion engine of the present invention, it is possible to preferably control the crank angle when the engine stops, even in the case of the three-or-less cylinder internal combustion engine.

In one aspect of the stop control apparatus for the internal combustion engine of the present invention, wherein the predetermined opening degree is set as a value that allows intake negative pressure to be reduced to zero, in the intake stroke immediately before the internal combustion engine stops.

According to this aspect, if the opening degree of the throttle valve is set to the predetermined opening degree, the intake negative pressure of the intake manifold is reduced to zero. Incidentally, "zero" herein does not only mean that the intake negative pressure is completely zero, but also broadly includes that it is small enough to eliminate the adverse effect by the intake negative pressure described above.

The setting of the predetermined opening degree of the throttle valve as described above can certainly reduce the adverse effect of the intake negative pressure in the stop control of the internal combustion engine. Therefore, it is possible to control, the crank angle when the engine stops, more preferably.

In one aspect of the stop control apparatus for the internal combustion engine of the present invention, wherein the predetermined opening degree is fully open.

According to this aspect, the opening degree of the throttle valve in the intake stroke immediately before the internal combustion engine stops is controlled to be fully open. The study of the present inventor has revealed that the fully open throttle valve allows the engine to be certainly stopped with the crank angle having the desired value, regardless of, for example, specifications of the engine or the like. In this aspect, it is thus possible to control the crank angle when the engine stops, more preferably.

In one aspect of the stop control apparatus for the internal combustion engine of the present invention, wherein the stop control apparatus comprises a motor number-of-revolutions-detecting device configured to detect the number of revolutions of the motor, and the adjusting torque determining device increases the adjusting torque with increasing number of revolutions of the motor at a start of stop control of the internal combustion engine, and reduces the adjusting torque with reducing number of revolutions of the motor.

According to this aspect, the number of revolutions of the motor is detected by the motor number-of-revolutions detecting device. On the adjusting torque determining device, the adjusting torque is increased with increasing number of revolutions of the motor at the start of stop control of the internal combustion engine, and the adjusting torque is reduced with reducing number of revolutions of the motor.

As described above, if the adjusting torque is determined according to the number of revolutions of the motor, the deviation of the total amount of energy due to a difference in the number of revolutions is considered. It is thus possible to control the crank angle with higher accuracy when the engine stops.

In one aspect of the stop control apparatus for the internal combustion engine of the present invention, wherein the adjusting torque determining device reduces the adjusting torque if a gearshift of a transmission connected to the crankshaft of the internal combustion engine is in a D range for driving, in comparison with in a P range for stopping.

According to this aspect, the number of revolutions of the motor is indirectly determined depending on whether the gearshift of the transmission is in the D (drive) range for driving, or the P (parking) range for stopping. Specifically, in the case of the D range, the number of revolutions of the motor is determined to be smaller than that in the case of the P range.

In this manner, the number of revolutions of the motor can be easily estimated without actually detecting the number of revolutions of the motor. It is therefore possible to increase the accuracy of the crank angle control in a relatively simple configuration.

The operation and other advantages of the present invention will become more apparent from the embodiment explained below.

MODES FOR CARRYING OUT THE INVENTION

Hereinafter, embodiments of the present invention will be explained with reference to the drawings.

Figure 1:
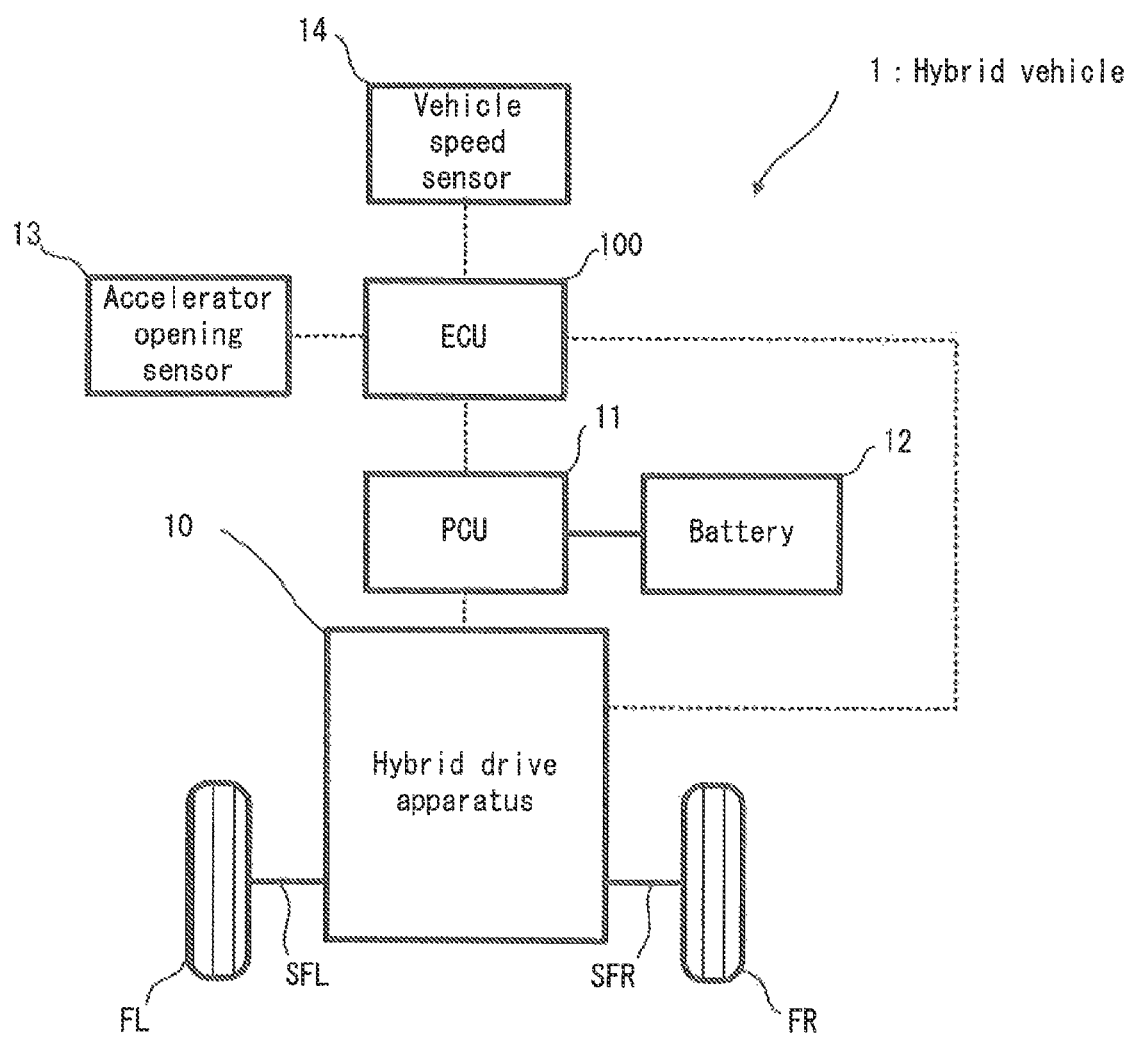
FIG. 1 is a schematic configuration diagram conceptually illustrating a configuration of a hybrid vehicle.

Firstly, an entire configuration of a hybrid vehicle in which a stop control apparatus for an internal combustion engine in the embodiment is installed will be explained with reference to FIG. 1. FIG. 1 is a schematic configuration diagram conceptually illustrating the configuration of the hybrid vehicle.

In FIG. 1, a hybrid vehicle 1 in the embodiment is provided with a hybrid drive apparatus 10, a power control unit (PCU) 11, a battery 12, an accelerator opening sensor 13, a vehicle speed sensor 14, and an ECU 100.

The ECU 100 is provided with a central processing unit (CPU), a read only memory (ROM), a random access memory (RAM), and the like. The ECU 100 is an electronic control unit configured to control the operation of each unit of the hybrid vehicle 1. The ECU 100 is configured to perform various controls of the hybrid vehicle 1 in accordance with a control program stored in, for example, the ROM or the like.

The PCU 11 converts direct-current (DC) power extracted from the battery 12 into alternating-current (AC) power and supplies it to motor generators MG1 and MG2 described later. The PCU 11 includes a not-illustrated inverter capable of converting AC power generated by the motor generators MG1 and MG2 into DC power and supplying it to the battery 12. In other words, the PCU 11 is a power control unit configured to control input/output of electric power between the battery 12 and each motor generator, or input/output of electric power between the motor generators (i.e. in this case, the electric power is transferred between the motor generators without via the battery 12). The PCU 11 is electrically connected to the ECU 100, and the operation thereof is controlled by the ECU 100.

The battery 12 is a chargeable storage battery which functions as an electric power supply source associated with the electric power for power running of the motor generators MG1 and MG2. The amount of stored power of the battery 12 can be detected by the ECU 100 or the like.

The accelerator opening sensor 13 is a sensor configured to detect an accelerator opening degree Ta which is a manipulated variable or an operation amount of a not-illustrated accelerator pedal of the hybrid vehicle 1. The accelerator opening sensor 13 is electrically connected to the ECU 100, and the detected accelerator opening degree Ta is referred to by the ECU 100 with a regular or irregular period.

The vehicle speed sensor 14 is a sensor configured to detect a vehicle speed V of the hybrid vehicle 1. The vehicle speed sensor 14 is electrically connected to the ECU 100, and the detected vehicle speed V is referred to by the ECU 100 with a regular or irregular period.

Figure 2:
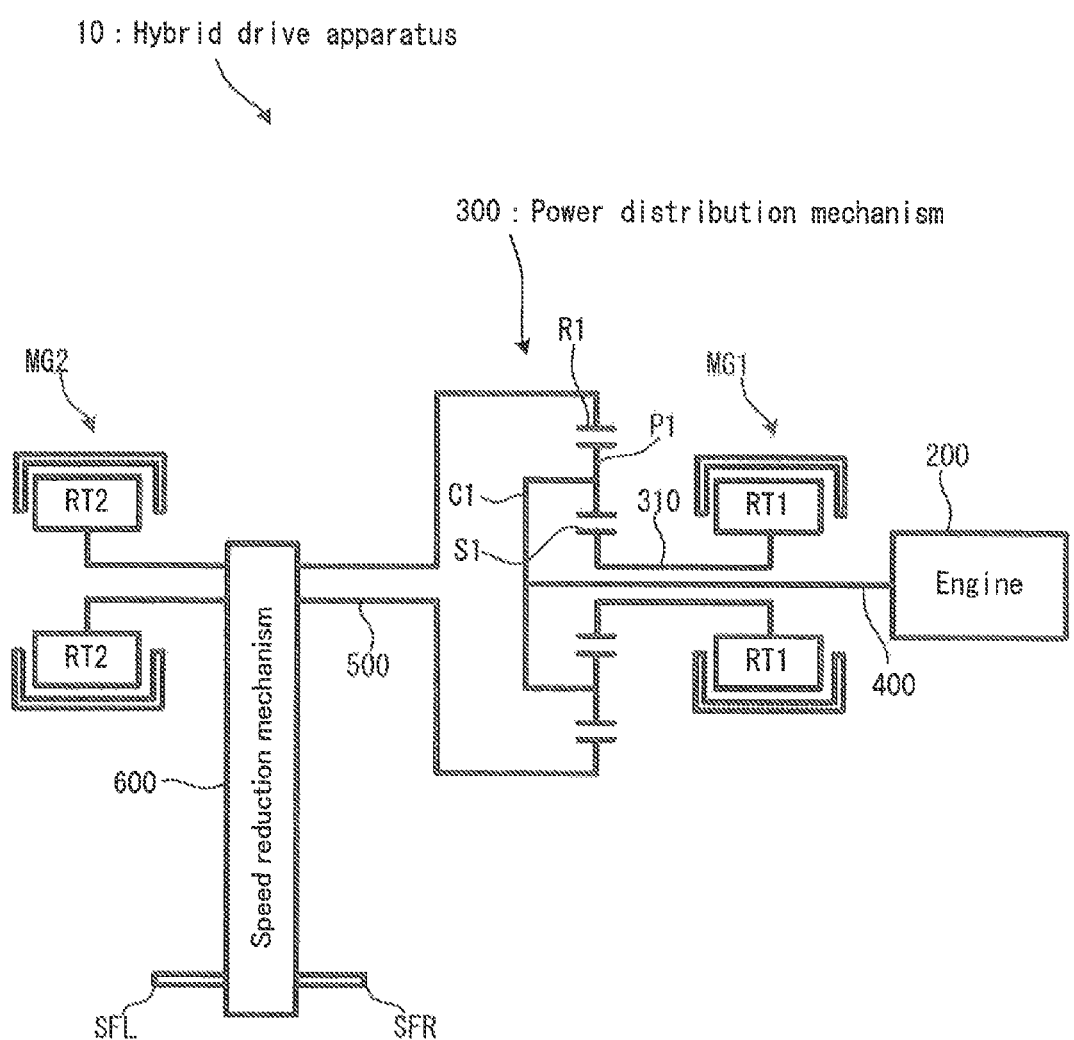
FIG. 2 is a schematic configuration diagram conceptually illustrating a configuration of a hybrid drive apparatus.

The hybrid drive apparatus 10 is a power unit which functions as a power train of the hybrid vehicle 1. Now, with reference to FIG. 2, a detailed configuration of the hybrid drive apparatus 10 will be explained. FIG. 2 is a schematic configuration diagram conceptually illustrating the configuration of the hybrid drive apparatus.

In FIG. 2, the hybrid drive apparatus 10 is provided mainly with an engine 200, a power distribution mechanism 300, the motor generator MG1 (hereinafter abbreviated to "MG1" as occasion demands), the motor generator MG2 (hereinafter abbreviated to "MG2" as occasion demands), an input shaft 400, a drive shaft 500, and a speed reduction mechanism 600.

Figure 3:
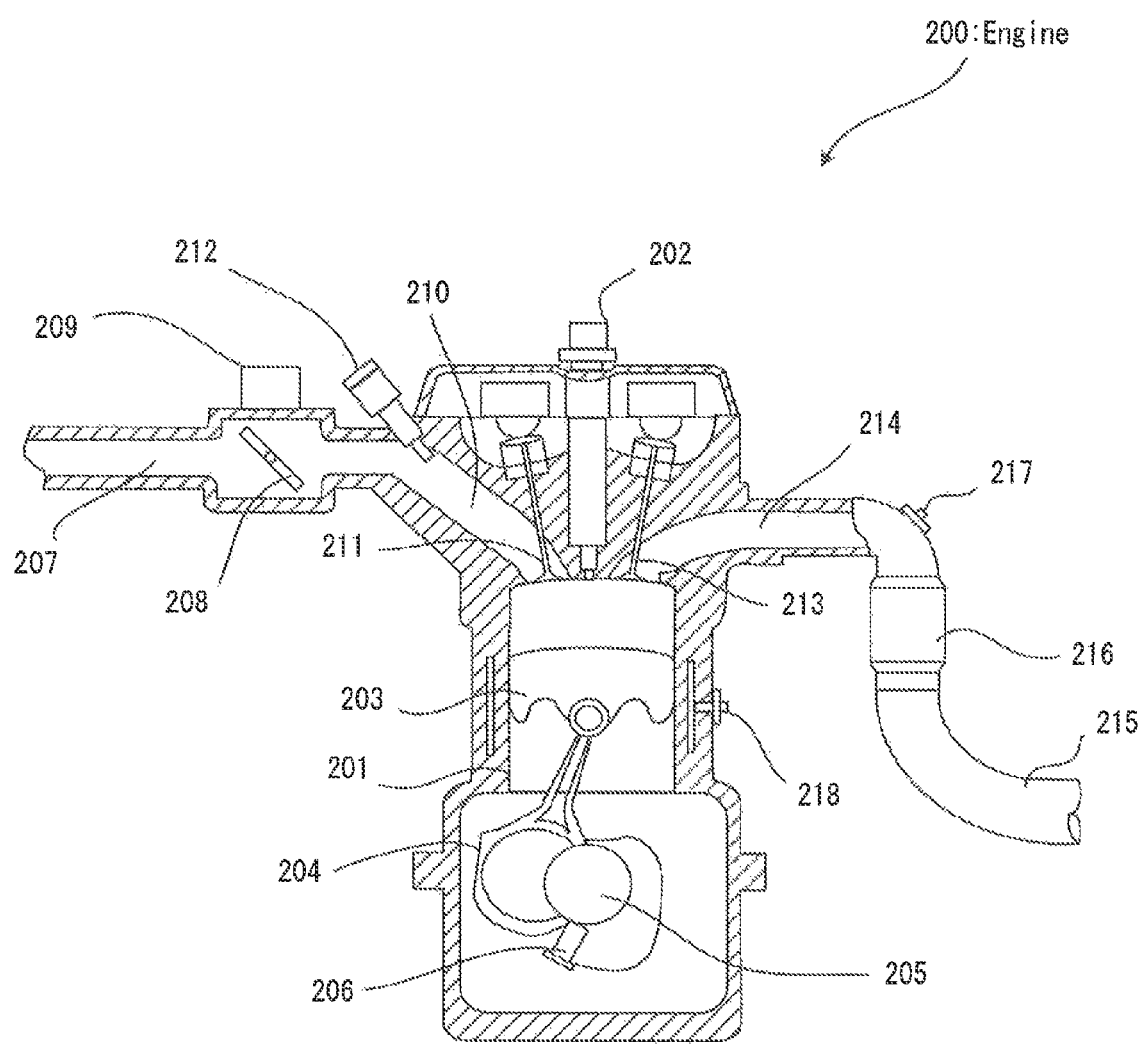
FIG. 3 is a schematic configuration diagram conceptually illustrating a configuration of an engine.

The engine 200 is a gasoline engine as one example of the "internal combustion engine" of the present invention. The engine 200 is configured to function as a main power source of the hybrid vehicle 10. Now, with reference to FIG. 3, a detailed configuration of the engine 200 will be explained. FIG. 3 is a schematic diagram illustrating a cross sectional configuration of the engine.

Incidentally, the "internal combustion engine" of the present invention conceptually includes an engine which has three or less cylinders and which is configured to extract a force generated when an air-fuel mixture containing various fuels such as, for example, gasoline, light oil or alcohol is burned in a combustion chamber within the cylinder(s), as a driving force through a physical or mechanical transmitting device such as, for example, a piston, a connecting rod, and a crankshaft, as occasion demands. As long as the concept is satisfied, the configuration of the internal combustion engine of the present invention is not limited to that of the engine 200 but may have various aspects.

Incidentally, even a four-or-more cylinder engine shall be included in the internal combustion engine of the present invention as long as it can be temporarily driven as the three-or-less cylinder engine due to cylinder deactivation or the like and is driven as the three-or-less cylinder engine during stop control described later.

Moreover, the engine 200 is an engine in which a plurality of cylinders 201 are aligned in a direction perpendicular to the paper; however, only one cylinder 201 will be explained in FIG. 3 because the individual cylinders 201 have the same configuration.

In FIG. 3, the engine 200 is configured to enable the air-fuel mixture to be burned via an ignition operation of an ignition apparatus 202 in which a spark plug (whose reference numeral is omitted) is partially exposed in a combustion chamber in the cylinder 201. The engine 200 is also configured to convert a reciprocating motion of a piston 203 caused by an explosive force due to the combustion, into a rotational motion of a crankshaft 205 through a connecting rod 204.

In the vicinity of the crankshaft 205, there is disposed a crank position sensor 206 configured to detect a rotational position of the crankshaft 205 (i.e. a crank angle). The crank position sensor 206 is electrically connected to the ECU 100 (not illustrated), and the ECU 100 is configured to calculate the number of engine revolutions NE of the engine 200 on the basis of a crank angle signal outputted from the crank position sensor 206.

In the engine 200, the air sucked from the exterior (or intake air) is supplied through an intake tube 207 and an intake port 210 to the inside of the cylinder 201 upon opening of an intake valve 211. On the other hand, a fuel injection valve of an injector 212 is exposed in the intake port 210, and the fuel injection valve is configured to inject fuel to the intake port 210. The fuel injected from the injector 212 is mixed with the intake air before or after the opening timing of the intake valve 211, thereby making the aforementioned air-fuel mixture.

The fuel is stored in a not-illustrated fuel tank and is supplied to the injector 212 through a not-illustrated delivery pipe by the operation of a not-illustrated feed pump. The air-fuel mixture burned in the cylinder 201 becomes an exhaust gas and is supplied to an exhaust tube 215 through an exhaust port 214 upon opening of an exhaust valve 213 which opens or closes in conjunction with the opening or closing of the intake valve 211.

On the other hand, on the upstream side of the intake port 210 in the intake tube 207, there is disposed a throttle valve 208 configured to adjust an intake air amount associated with the intake air supplied through a not-illustrated cleaner. The throttle valve 208 is one example of the "throttle valve" of the present invention and is configured such that a driving state thereof is controlled by a throttle valve motor 209 which is electrically connected to the ECU 100. Incidentally, the ECU 100 controls the throttle valve motor 209 basically to obtain a throttle opening degree according to the opening degree of an accelerator pedal which is not illustrated (i.e. the aforementioned accelerator opening degree Ta); however, the ECU 100 can also adjust the throttle opening degree without a driver's intention through the operation control of the throttle valve motor 209. In other words, the throttle valve 208 is configured as a kind of electronically-controlled throttle valve.

In the exhaust tube 215, a three-way catalyst 216 is disposed. The three-way catalyst 216 is a catalyst apparatus configured to reduce NOx (nitrogen oxide) in the exhaust gas emitted from the engine 200 and to oxidize CO (carbon monoxide) and HC (hydrocarbon) in the exhaust gas. Incidentally, a form which can be adopted by the catalyst apparatus is not limited to the three-way catalyst as described above. Instead of or in addition to the three-way catalyst, various catalysts such as, for example, a. NSR catalyst (or NOx storage-reduction catalyst) or an oxidation catalyst may be disposed.

Moreover, in the exhaust tube 215, there is disposed an air-fuel ratio sensor 217 configured to detect an exhaust air-fuel ratio of the engine 200. Moreover, in a water jacket disposed in a cylinder block which accommodates the cylinder 201, there is disposed a water temperature sensor 218 for detecting a coolant temperature associated with a coolant (LLC) circulated and supplied to cool the engine 200. Each of the air-fuel ratio sensor 217 and the temperature sensor 218 is electrically connected to the ECU 100, and each of the detected air-fuel ratio and the detected coolant temperature is recognized by the ECU 100 with a regular or irregular detection period.

Back in FIG. 2, the motor generator MG1 is one example of the "motor" of the present invention, and is an electric motor generator having a power running function for converting electrical energy into kinetic energy and a regeneration function for converting kinetic energy into electrical energy. The motor generator MG2, as in the motor generator MG1, is an electric motor generator having the power running function for converting electrical energy into kinetic energy and the regeneration function for converting kinetic energy into electrical energy. Incidentally, the motor generators MG1 and MG2 may be configured, for example, as synchronous motor generators. For example, each of the motor generators MG1 and MG2 is provided with a rotor having a plurality of permanent magnets on an outer circumferential surface and a stator in which a three-phase coil for forming a rotating magnetic field is wound; however, each of the motor generators may have another configuration.

The power distribution mechanism 300 is provided with a sun gear S1 provided in a central portion thereof, a ring gear R1 provided concentrically on an outer circumference of the sun gear S1, a plurality of pinion gears P1 which are disposed between the sun gear S1 and the ring gear R1 and each of which revolves around the outer circumference of the sun gear S1 while rotating on its own axis, and a carrier C1 which supports a rotating shaft of each pinion gear.

Here, the sun gear S1 is coupled with a rotor RT1 of the MG1 through a sun gear shaft 310 and the number of revolutions thereof is equivalent to the number of revolutions Nmg1 of the MG1 (hereinafter referred to as "MG1 number-of-revolutions Nmg1" as occasion demands). The ring gear R1 is coupled with a rotor RT2 of the MG2 through a clutch 710, the drive shaft 500, and the speed reduction mechanism 600, and the number of revolutions thereof has an unambiguous relation with the number of revolutions Nmg2 of the MG2 (hereinafter referred to as "MG2 number-of-revolutions Nmg2" as occasion demands). Moreover, the carrier C1 is coupled with the input shaft 400 coupled with the aforementioned crankshaft 205 of the engine 200, and the number of revolutions thereof is equivalent to the number of engine revolutions NE of the engine 200. In the hybrid drive apparatus 10, each of the MG1 number-of-revolutions Nmg1 and the MG2 number-of-revolutions Nmg2 is detected with a regular period, by a rotation sensor such as a resolver, and is transmitted to the ECU 100 with a regular or irregular period.

On the other hand, the drive shaft 500 is coupled with drive shafts SFR and SFL which drive a right front wheel FR and a left front wheel FL as driving wheels of the hybrid vehicle 1, respectively, via the speed reduction mechanism 600 which is a speed reducing apparatus including various reduction gears and differential gears. Therefore, motor torque Tmg2 supplied from the motor generator MG2 to the drive shaft 500 is transmitted to each drive shaft via the speed reduction mechanism 600, and a driving force from each driving wheel transmitted through each drive shaft is inputted to the motor generator MG2 via the speed reduction mechanism 600 and the drive shaft 500 in the same manner. Therefore, the MG2 number-of-revolutions Nmg2 has an unambiguous relation with the vehicle speed V of the hybrid vehicle 1.

The power distribution mechanism 300 is configured to distribute engine torque Te which is supplied from the engine 200 to the input shaft 400 through the crankshaft 205, to the sun gear S1 and the ring gear R1 at a predetermined ratio (a ratio according to a gear ratio between the gears) by the carrier C1 and the pinion gears P1, and is configured to divide the power of the engine 200 into two systems, under the above configuration.

Figure 4:
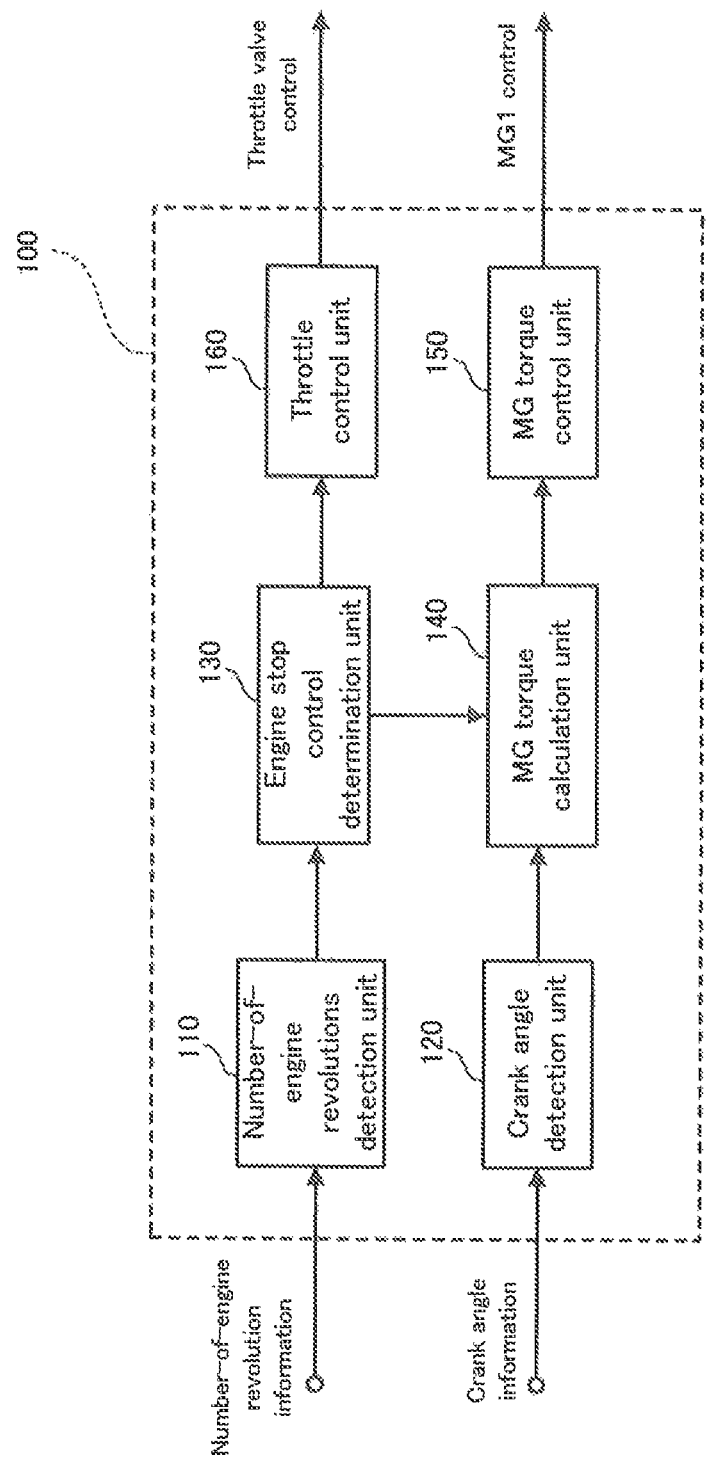
FIG. 4 is a block diagram illustrating a configuration of an ECU.

Next, a specific configuration of the ECU 100 which constitutes a part of the stop control apparatus for the internal combustion engine in the embodiment will be explained with reference to FIG. 4. FIG. 4 is a block diagram illustrating the configuration of the ECU 100.

In FIG. 4, the ECU 100 in the embodiment is provided with a number-of-engine-revolutions detection unit 110, a crank angle detection unit 120, an engine stop control determination unit 130, a MG torque calculation unit 140, a MG torque control unit 150, and a throttle control unit 160.

The number-of-engine-revolutions detection unit 110 is one example of the "number-of-revolutions detecting device" of the present invention, and detects the number of revolutions NE of the engine 200 on the basis of information about the crank angle which is obtained from, for example, the crank position sensor 206 (refer to FIG. 3). The number of revolutions NE of the engine 200 detected on the number-of-engine-revolutions detection unit 110 is outputted to the engine stop control determination unit 130.

The crank angle detection unit 120 is one example of the "crank angle detecting device" of the present invention, and detects the crank angle of the crankshaft 205 on the basis of the information about the crank angle which is obtained from, for example, the crank position sensor 206. The crank angle detected on the crank angle detection unit 120 is outputted to the MG torque calculation unit 140.

The engine stop control determination unit 130 performs various determinations in the stop control of the engine 200 on the basis of the number of revolutions NE of the engine 200 detected on the number-of-engine-revolutions detection unit 110. The engine stop control determination unit 130 has, for example, at least one threshold value for the number of revolutions NE of the engine 200 in order to perform the engine stop control, and determines whether or not to perform various controls in the engine stop control depending on whether or not the detected number of revolutions NE exceeds the threshold value. The engine stop control determination unit 130 controls each of the MG torque calculation unit 140 and the throttle control unit 160 if determining to perform the engine stop control.

The MG torque calculation unit 140 is one example of the "adjusting torque determining device" of the present invention, and determines torque to be outputted from the MG1. The MG torque calculation unit 140 calculates reducing torque for reducing the number of revolutions of the engine 200 in the engine stop control, and adjusting torque for adjusting the position of the crank angle. Here, in particular, the aforementioned adjusting torque is calculated by using the crank angle which is obtained from the crank angle detection unit 120. The MG torque calculation unit 140 stores therein, for example, a map for deriving the adjusting torque from the crank angle. A value calculated on the MG torque calculation unit 140 is outputted to the MG torque control unit 150.

The MG torque control unit 150 is one example of the "motor controlling device" of the present invention. The MG torque control unit 150 controls the motor generator MG1 to output the torque which is calculated on the MG torque calculation unit 140.

The throttle control unit 160 is one example of the "throttle valve controlling device" of the present invention. The throttle control unit 160 drives the throttle valve motor 209 (refer to FIG. 3), thereby controlling the opening degree of the throttle valve 208. The throttle control unit 160 in the embodiment particularly sets the throttle valve 208 to have a predetermined opening degree which is set in advance, upon engine stop control. The operation upon engine stop control will be detailed later.

The ECU 100 which includes the aforementioned parts is an electronic control unit which is integrally configured, and all the operations related to the aforementioned parts are configured to be performed by the ECU 100. The physical, mechanical, and electrical configurations of the aforementioned parts in the present invention are not limited to this example. Far example, each of the parts may be configured as various computer systems, such as a plurality of ECUs, various processing units, various controllers, or micro computer apparatuses.

Next, the operation of the stop control apparatus for the internal combustion engine in the embodiment will be explained, with two embodiments exemplified.

<First Embodiment>

Figure 5:
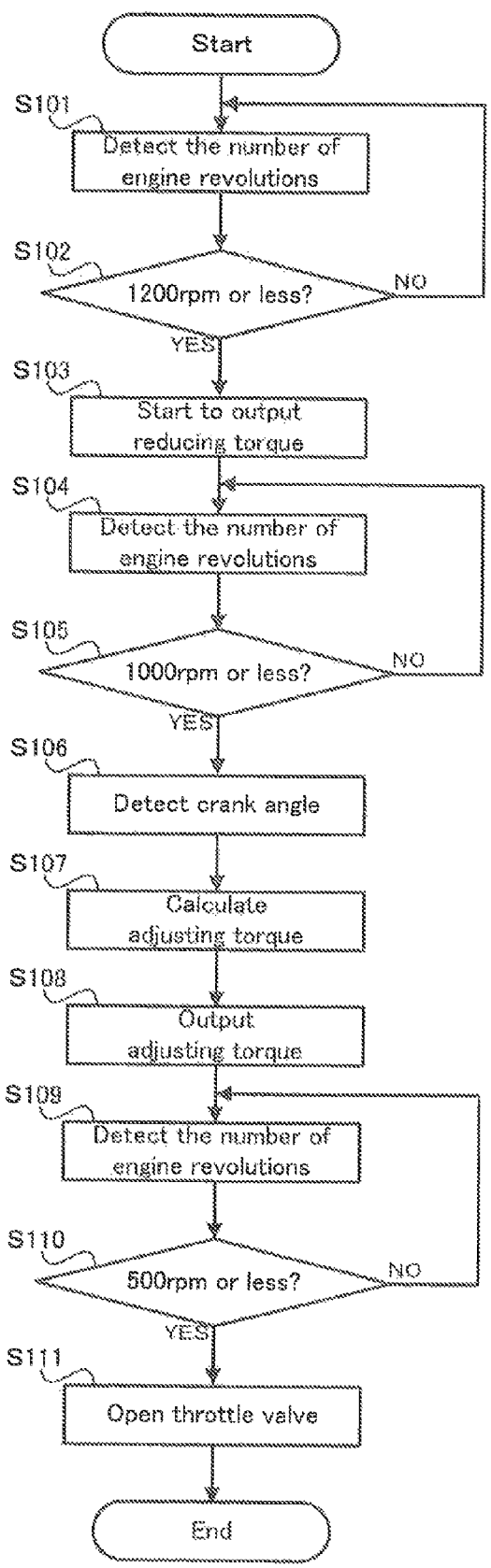
FIG. 5 is a flowchart illustrating the operation of a stop control apparatus for an internal combustion engine in a first embodiment.
Figure 6:
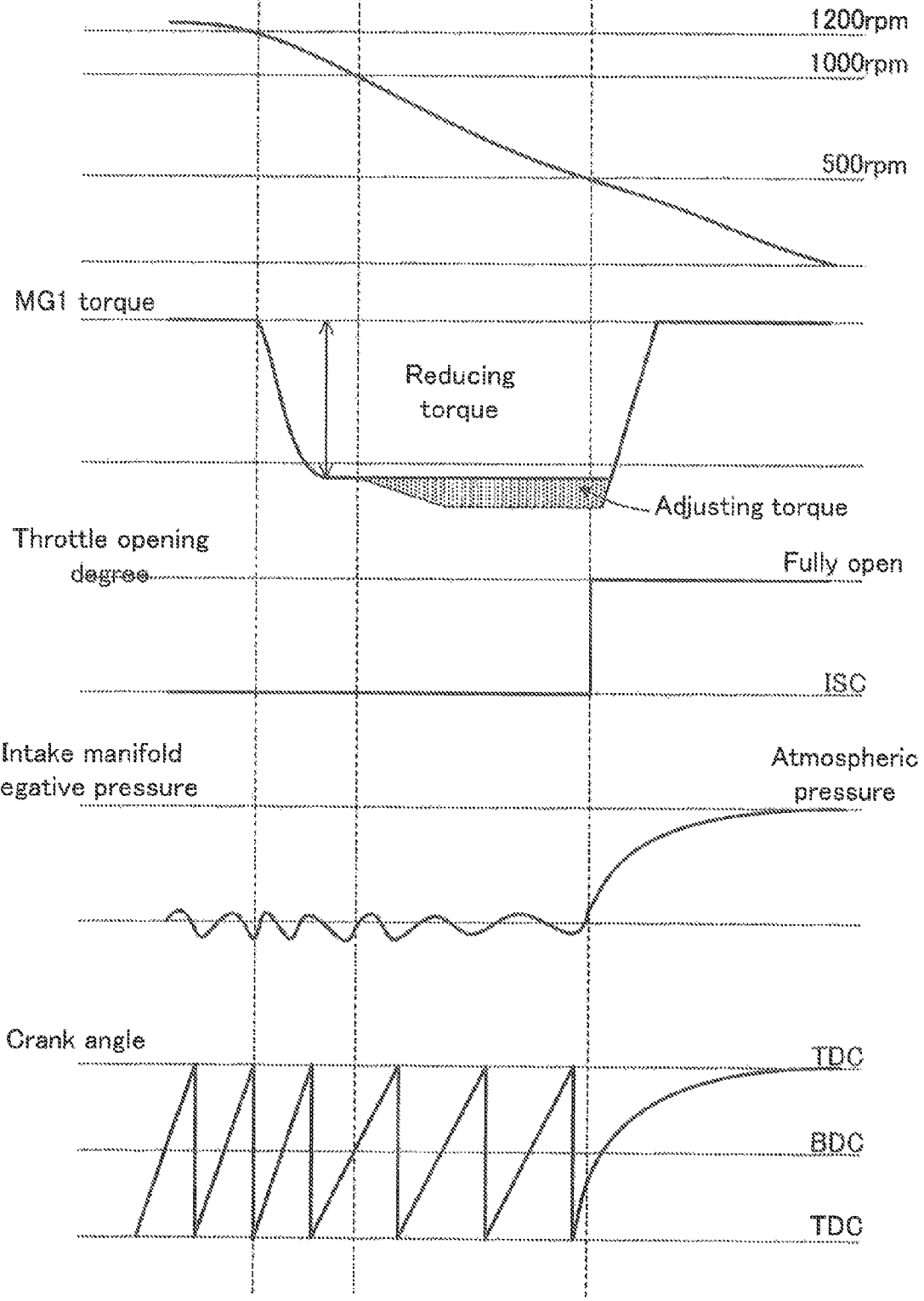
FIG. 6 is a chart illustrating changes in various parameters in operation of the stop control apparatus for the internal combustion engine in the first embodiment.

Firstly, the operation of the stop control apparatus for the internal combustion engine in the first embodiment will be explained with reference to FIG. 5 to FIG. 8. FIG. 5 is a flowchart illustrating the operation of the stop control apparatus for the internal combustion engine in the first embodiment. FIG. 6 is a chart illustrating changes in various parameters in operation of the stop control apparatus for the internal combustion engine in the first embodiment.

In FIG. 5 and FIG. 6, in operation of the stop control apparatus for the internal combustion engine in the first embodiment, firstly, the number of revolutions NE of the engine 200 is detected on the number-of-engine-revolutions detection unit 110 (step S101). If the number of revolutions NE of the engine 200 is detected, it is determined on the engine stop control determination unit 130 whether or not the detected value is 1200 rpm or less (step S102). Incidentally, the value of 1200 rpm herein is a threshold value for determining whether or not to start the engine stop control, and is stored in advance in the engine stop control determination unit 130.

If it is determined that the detected value is 1200 rpm or less (the step S102: YES), the reducing torque to be outputted from the MG1 is calculated on the MG torque calculation unit 140, and the MG1 is controlled to output the calculated reducing torque by the MG torque control unit 150 (step S103).

If the reducing torque cannot be sufficiently outputted from the MG1, for example, due to Win limit or the like in the battery 12, it is possible to compensate for the output shortage of the MG1 by temporally reducing the opening degree of the throttle valve 208 before the output of the reducing torque and producing the braking effect due to the intake negative pressure.

Then, the number of revolutions NE of the engine 200 is detected again on the number-of-engine-revolutions detection unit 110 (step S104). If the number of revolutions NE of the engine 200 is detected, it is determined on the engine stop control determination unit. 130 whether or not the detected value is 1000 rpm or less (step S105). Incidentally, the value of 1000 rpm herein is a threshold value for determining whether or not to start the output of the adjusting torque for adjusting the crank angle, and is stored in advance in the engine stop control determination unit 130.

If it is determined that the detected value is 1000 rpm or less (the step S105: YES), firstly, the value of the crank angle at that time point, is detected on the crank angle detection unit 120 (step S106). Then, the adjusting torque to be outputted from the MG1 is calculated by the MG torque calculation unit 140 on the basis of the detected value of the crank angle (step S107).

Figure 7:
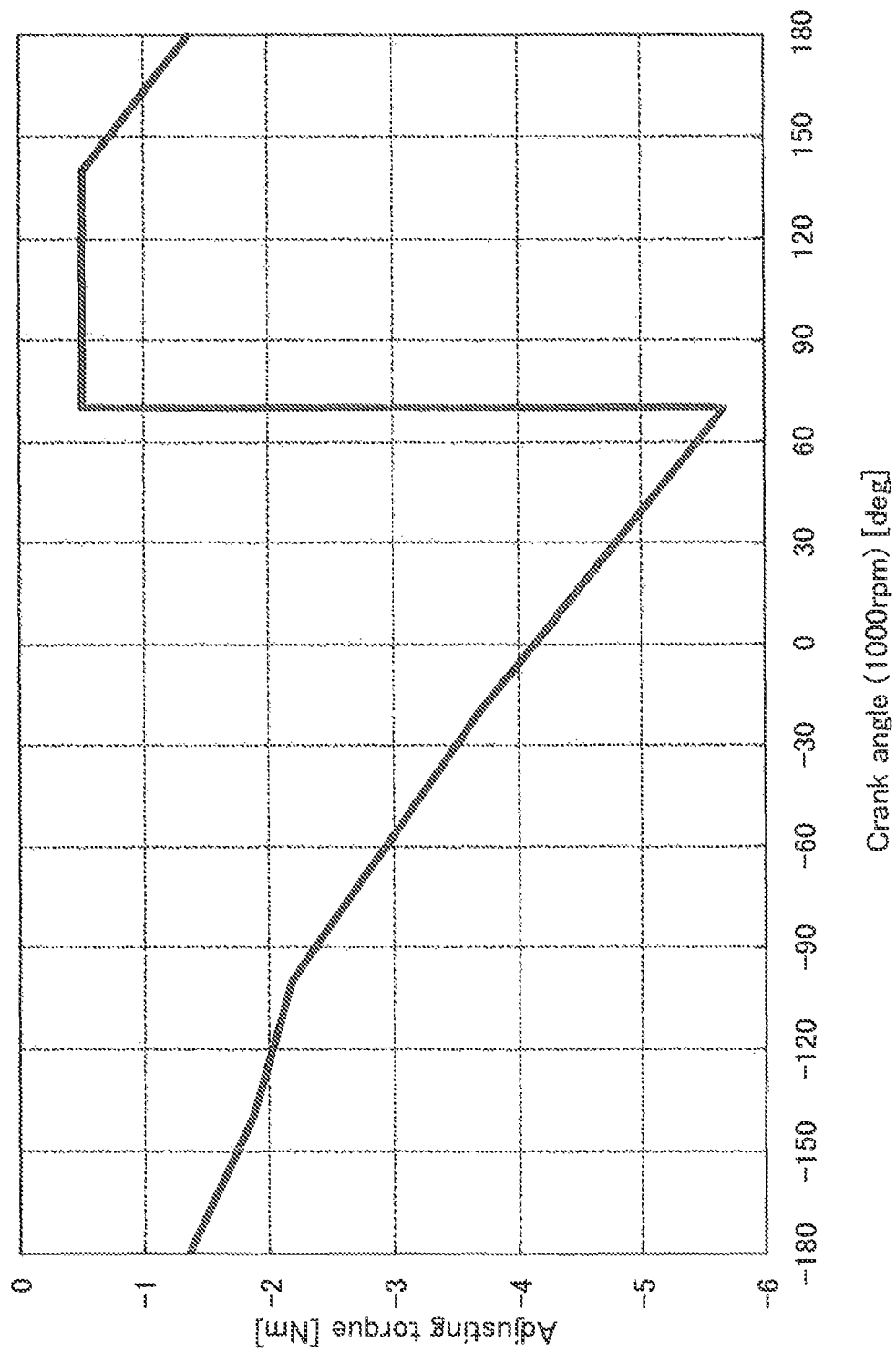
FIG. 7 is a map for calculating adjusting torque from a crank angle.

Now, a specific method of calculating the adjusting torque will be explained with reference to FIG. 7. FIG. 7 is a map for calculating the adjusting torque from the crank angle. Incidentally, the map in FIG. 7 illustrates a torque value for controlling the crank angle after the engine stop to be about 120 deg to 150 deg, which is immediately before the top dead center.

By using the map as illustrated in FIG. 7, the value of the adjusting torque to be outputted can be unambiguously determined from the value of the crank angle when the number of revolutions NE of the engine 200 is 1000 rpm. The map as described above can be prepared, for example, by repeating a test for studying what type of torque is to be outputted to set the crank angle after the engine stop at a desired position.

Back in FIG. 5 and FIG. 6, if the adjusting torque is calculated, the MG1 is controlled to output the calculated adjusting torque, by the MG torque control unit 150 (step S108). The adjusting torque is outputted, as illustrated in a hatched portion in FIG. 6, in a form of being added to the reducing torque which has been outputted by that time.

Then, the number of revolutions NE of the engine 200 is detected again on the number-of-engine-revolutions detection unit 110 (step S109). If the number of revolutions NE of the engine 200 is detected, it is determined on the engine stop control determination unit 130 whether or not the detected value is 500 rpm or less (step S110). Incidentally, the value of 500 rpm herein is a threshold value for determining whether or not to set the opening degree of the throttle valve 208 fully open, and is stored in advance in the engine stop control determination unit 130.

It is also possible to suppress driving noise caused by damper resonance, by bringing the threshold value herein close to a resonance band of a damper (e.g. 350 rpm). Specifically, if the resonance band of the damper is overlapped in the compression stroke, the driving noise caused by the damper resonance deteriorates due to compression reaction force. In contrast, if a threshold value which allows the opening degree of the throttle valve 208 to be set fully open is set to be the resonance band of the damper, it is possible to effectively suppress the driving noise, because the resonance band of the damper can be passed through in the intake stroke immediately before the engine stop.

If it is determined that the detected value is 500 rpm or less (the step S110: YES), the throttle valve motor 209 is driven by the throttle control unit 160, and the opening degree of the throttle valve 208 is set fully open. By setting the opening degree of the throttle valve 208 fully open, the intake negative pressure of an intake manifold is reduced and brought close to the atmospheric pressure. This reduces the braking effect of the piston 203 caused by the negative pressure in the intake stroke, and increases the other braking effect in the compression pressure. This makes it easy to stop the crank angle immediately before the top dead center.

Here, the explanation was given to the case where the opening degree of the throttle valve 208 shall be set fully open; however, the opening degree is not necessarily set fully open as long as it has a value that can eliminate an adverse effect of the intake negative pressure in the intake stroke described above.

Figure 8:
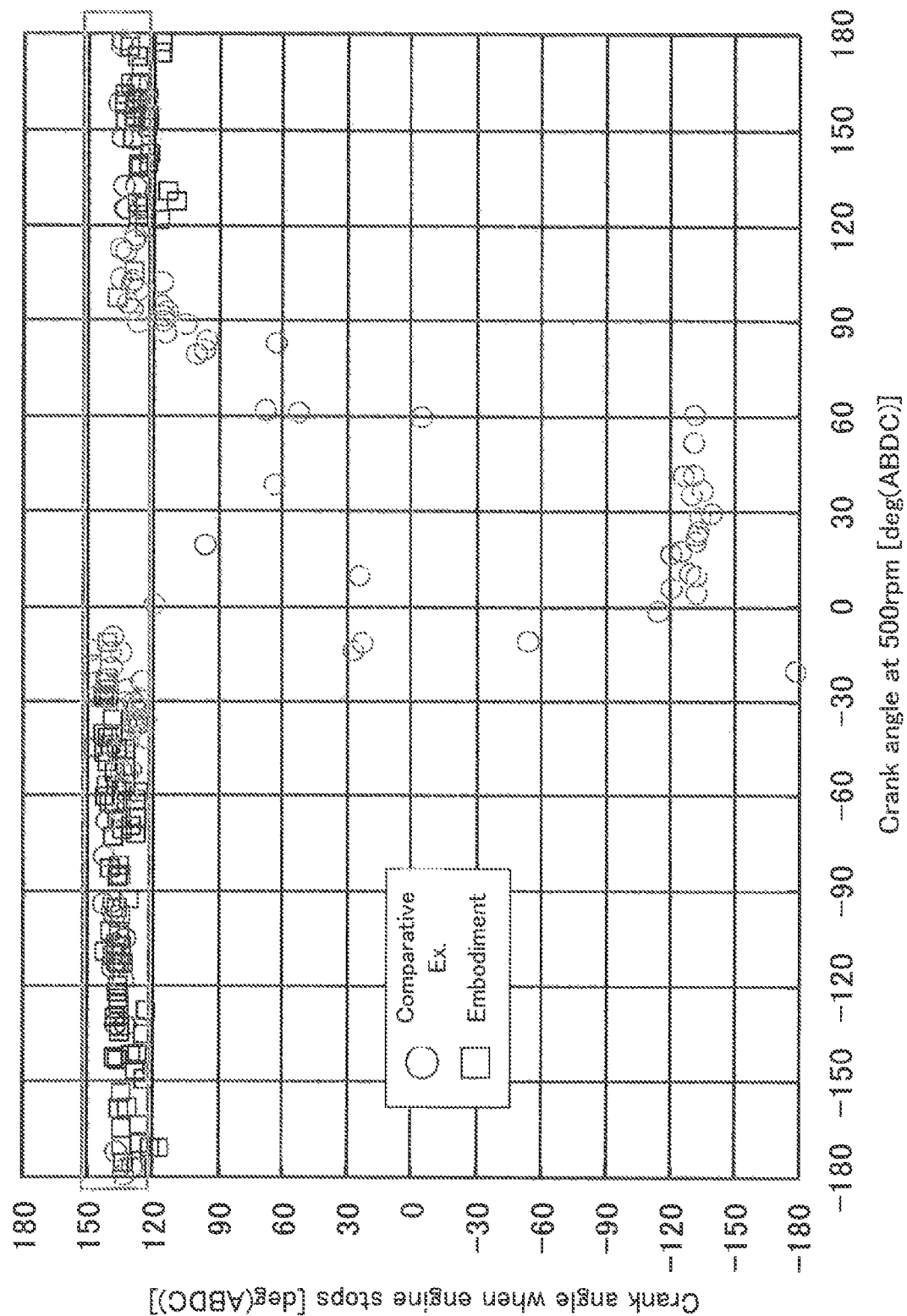
FIG. 8 is a graph illustrating a relation between a crank angle at 500 rpm and a crank angle when the engine stops.

Lastly, the effect of the engine stop control by the stop control apparatus for the internal combustion engine in the first embodiment will be explained with reference to FIG. 8, FIG. 8 is a graph illustrating a relation between the crank angle at 500 rpm and the crank angle when the engine stops. A comparative example in FIG. 8 illustrates a result in a case where only the control of setting the throttle valve 208 fully open is performed out of the engine stop control in the first embodiment, and the adjusting torque is not outputted.

As illustrated in FIG. 8, in the comparative example in which the adjusting torque is not outputted, if the crank angle at 500 rpm which is the number of engine revolutions NE of the engine 200 is near a range of −30 deg to 90 deg, the crank angle when the engine 200 stops deviates from a target value (i.e. 120 deg to 150 deg). On the other hand, in the embodiment in which the adjusting torque is outputted, regardless of the crank angle when the number of engine revolutions NE of the engine 200 is 500 rpm, the crank angle when the engine 200 stops is in the range of the target value in almost all the cases. According to the engine stop control in the embodiment as described above, it is possible to control the crank angle with extremely high accuracy.

If the engine 200 is a multi-cylinder engine having four or more cylinders, since any of the cylinders is always in the intake stroke, the braking effect due to the intake negative pressure becomes constant and the crank angle is easily controlled even if the adjusting torque is not outputted. In the three-or-less-cylinder engine 200 as in the embodiment, however, since there can be a time in which none of the cylinders is in the intake stroke, the braking effect due to the intake negative pressure does not become constant, and the crank angle is hardly controlled. Therefore, the engine stop control in the embodiment in which the opening degree of the throttle valve 208 is adjusted while the adjusting torque is outputted is extremely useful.

As explained above, according to the stop control apparatus for the internal combustion engine in the first embodiment, it is possible to preferably control the crank angle when the engine stops.

<Second Embodiment>

Figure 9:
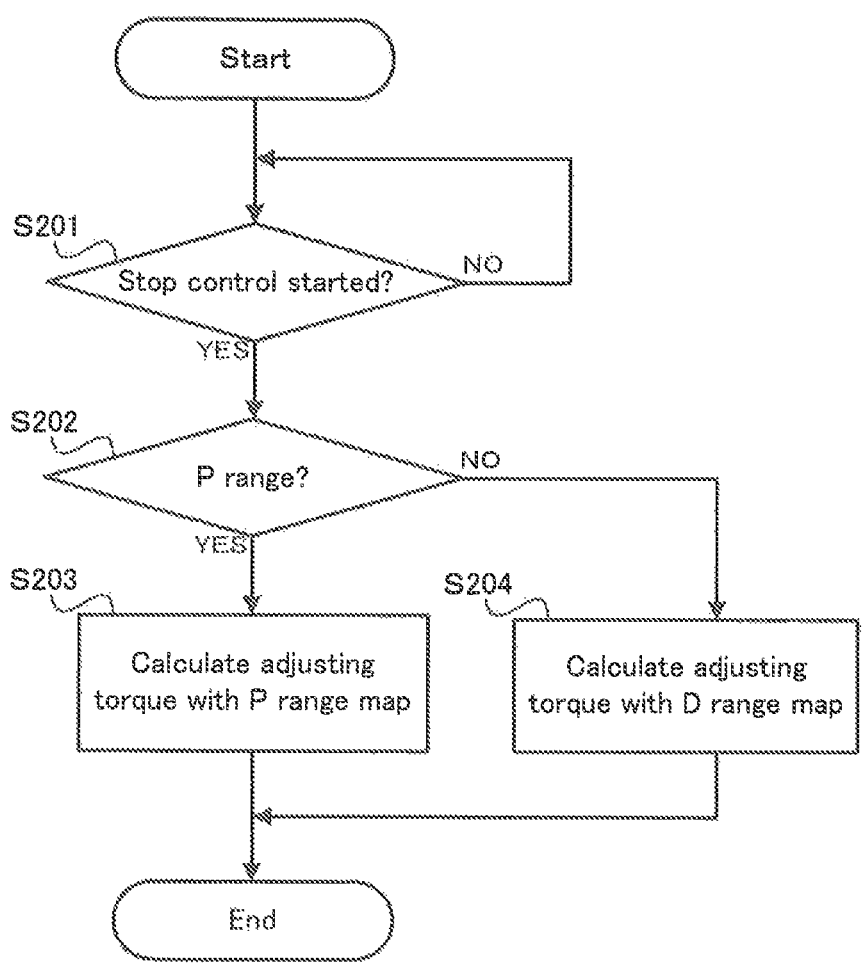
FIG. 9 is a flowchart illustrating the operation of a stop control apparatus for an internal combustion engine in a second embodiment.

Next, the operation of a stop control apparatus for an internal combustion engine in a second embodiment will be explained with reference to FIG. 9 to FIG. 12. FIG. 9 is a flowchart illustrating the operation of the stop control apparatus for the internal combustion engine in the second embodiment. The second embodiment is partially different from the aforementioned first embodiment in operation, but is substantially the same as the first embodiment regarding the other basic operation. Thus, in FIG. 9, a part of the processing illustrated in FIG. 5 is omitted as occasion demands, and only the processing different from that in the first embodiment is illustrated.

In FIG. 9, in operation of the stop control apparatus for the internal combustion engine in the second embodiment, if the engine stop control is started (step S201: YES), it is determined whether or not a gearshift of the hybrid vehicle 1 is in a P range (step S202). In other words, it is determined whether the gearshift of the hybrid vehicle 1 is in the P range for stopping the vehicle, or a D range for driving.

If it is determined that the gearshift of the hybrid vehicle 1 is in the P range (the step S202: YES), the adjusting torque is calculated by using a P range map (step S203). If it is determined that the gearshift of the hybrid vehicle 1 is not in the P range (i.e. is in the D range) (the step S202: NO), the adjusting torque is calculated by using a D range map (step S204).

Here, particularly in the case of the D range, the number of the revolutions of the MG1 is presumably smaller than that in the case of the P range. Thus, if the D range map is used, the adjusting torque is calculated as a smaller value than that in the case where the P range map is used. This is because rotational energy is proportional to the squares of the number of revolutions.

Figure 10:
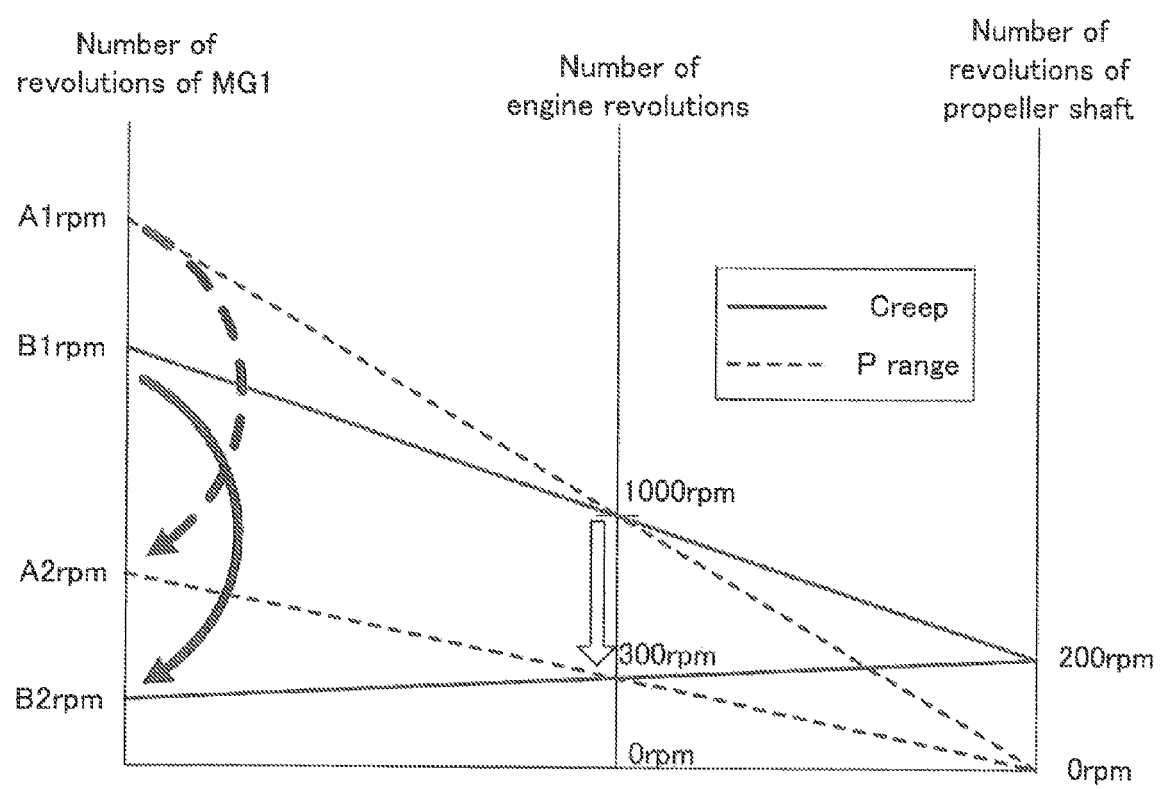
FIG. 10 is a nomogram illustrating the number of engine revolutions and the number of revolutions of MG1.
Figure 11:
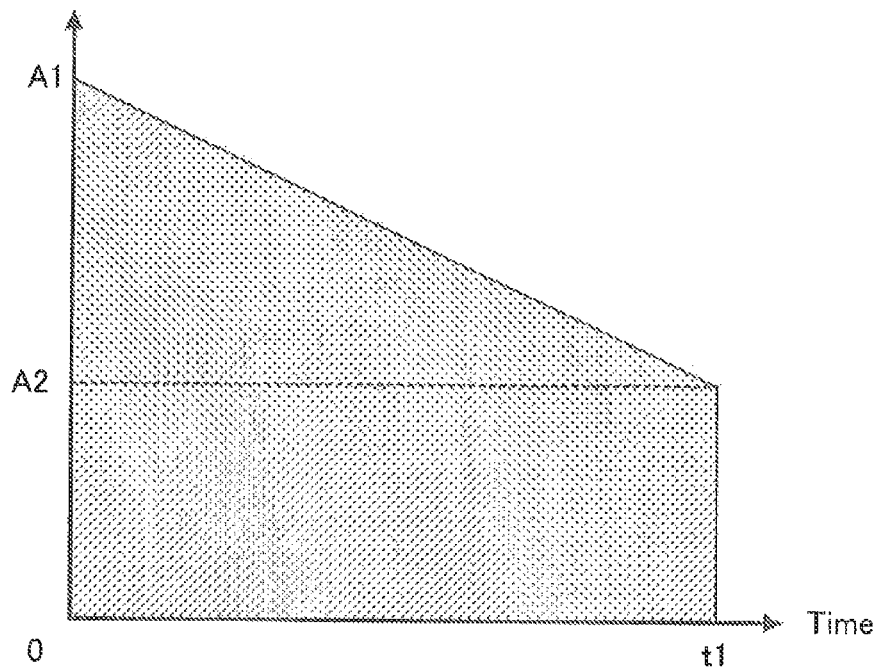
FIG. 11 is a graph illustrating time integration of an angular velocity when a vehicle stops.
Figure 12:
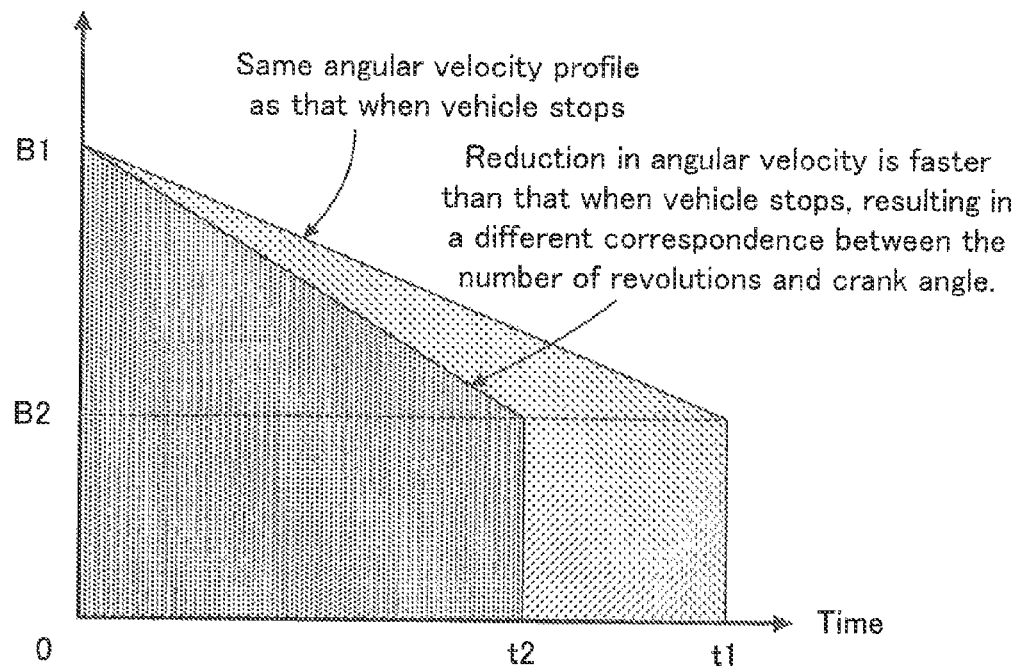
FIG. 12 is a graph illustrating time integration of an angular velocity in low-speed driving.

Hereinafter, the difference in the adjusting torque in the P range and the D range described above will be specifically explained with reference to FIG. 10 to FIG. 12, FIG. 10 is a nomogram illustrating the number of engine revolutions and the number of revolutions of the MG1. FIG. 11 is a graph illustrating time integration of an angular velocity when the vehicle steps. FIG. 12 is a graph illustrating time integration of an angular velocity in low-speed driving.

As illustrated in FIG. 10, a study is conducted on a case where the number of engine revolutions is reduced from 1000 rpm to 300 rpm in a vehicle during stop in the P range and in a vehicle in a creep state (i.e. in low-speed driving in the D range).

In the vehicle during stop in the P range, when the number of engine revolutions is reduced from 1000 rpm to 300 rpm, the number of revolutions of the MG1 is reduced from A1 rpm to A2 rpm. On the other hand, in the vehicle in the creep state, when the number of engine revolutions is reduced from 1000 rpm to 300 rpm, the number of revolutions of the MG1 is reduced from B1 rpm to B2 rpm. As is clear from the drawing, A1>B1>A2>B2 with regard to each value of the number of revolutions.

In FIG. 11, when the number of engine revolutions of the vehicle during stop in the P range is reduced from 1000 rpm to 300 rpm, if it takes a time t1 to uniformly output the reducing torque of 15 Nm, energy outputted from the MG1 can be calculated by multiplying a time integration value of the angular velocity (i.e. an area of a trapezoidal portion in the drawing) by the torque (i.e. 15 Nm) of the MG1, In FIG. 12, when the number of engine revolutions of the vehicle in the creep state is reduced from 1000 rpm to 300 rpm, in the same manner, if it takes a time t2 to uniformly output the reducing torque of 15 Nm, energy outputted from the MG1 can be calculated by multiplying a time integration value of the angular velocity (i.e. an area of a smaller trapezoidal portion in the drawing) by the torque (i.e. 15 NM) of the MG1.

As is clear from FIG. 12, however, since the time t2 is shorter than the time t1, a reduction in the angular velocity in the creep state is faster than that when the vehicle stops, resulting in a different correspondence between the number of revolutions and the crank angle. In order to solve the difference in angular velocity profile as described above, the torque of the MG1 may be set smaller than 15 Nm, and it may be set to take the time t1 to reduce the number of revolutions. In other words, in the D range with the smaller number of revolutions of the MG1, the same control as in the P range can be applied by setting the torque of the MG1 smaller than that in the P range.

As explained above, according to the stop control apparatus for the internal combustion engine in the second embodiment, it is possible to preferably control the crank angle even in the different ranges of the vehicle (i.e. in the different numbers of revolutions of the MG1 causing a difference in total amount of energy).

The present invention is not limited to the aforementioned embodiment, but various changes may be made, if desired, without departing from the essence or spirit of the invention which can be read from the claims and the entire specification. A control stop apparatus for an internal combustion engine, which involve such changes, is also intended to be within the technical scope of the present invention,

DESCRIPTION OF REFERENCE CODES 1 hybrid vehicle
10 hybrid drive apparatus
11 PCU
12 battery
13 accelerator opening sensor
14 vehicle speed sensor
100 ECU
110 number-of-engine-revolutions detection unit
120 crank angle detection unit
130 engine stop control determination unit
140 MG torque calculation unit
150 MG torque control unit
160 throttle control unit
200 engine
201 cylinder
203 piston
205 crankshaft
206 crank position sensor
208 throttle valve
209 throttle valve motor
210 intake port
212 injector
214 exhaust port
300 power distribution mechanism
500 drive shaft
600 speed reduction mechanism
MG1, MG2 motor generator

The invention claimed is:

1. A stop control apparatus for an internal combustion engine configured to control operation of a three-or-less cylinder internal combustion engine when the internal combustion engine stops, said stop control apparatus comprising:

a motor configured to output torque to a crankshaft of the internal combustion engine;

a number-of-revolutions detecting processor programmed to detect the number of revolutions of the internal combustion engine;

a crank angle detecting processor programmed to detect a crank angle of the crankshaft of the internal combustion engine;

a motor controlling processor programmed to control the motor to output adjusting torque which adjusts the crank angle when the internal combustion engine stops to have a desired value, when the internal combustion engine stops;

a throttle valve controlling processor programmed to control an opening degree of a throttle valve to be a predetermined opening degree in an intake stroke immediately before the internal combustion engine stops;

an adjusting torque determining processor programmed to determine the adjusting torque on the basis of the crank angle when the number of revolutions of the internal combustion engine has a predetermined value;

a power division mechanism having a first rotating element, a second rotating element, and a third rotating element which can mutually perform differential rotation, the first rotating element being connected to the internal combustion engine, the second rotating element being connected to the motor, and the third rotating element being connected to a drive shaft; and a motor number of revolutions detecting processor programmed to detect the number of revolutions of the motor, wherein:

the adjusting torque determining processor is further programmed to increase the adjusting torque with increasing number of revolutions of the motor at a start of stop control of the internal combustion engine, and reduces the adjusting torque with the reducing number of revolutions of the motor, and the motor controlling processor is further programmed to output the adjusting torque for a predetermined time.

2. The stop control apparatus for the internal combustion engine according to claim 1, wherein the predetermined opening degree is set as a value that allows intake negative pressure to be reduced to zero, in the intake stroke immediately before the internal combustion engine stops.

3. The stop control apparatus for the internal combustion engine according to claim 1, wherein the predetermined opening degree is fully open.

4. The stop control apparatus for the internal combustion engine according to claim 1, wherein
 the adjusting torque determining processor is further programmed to reduce the adjusting torque if a gearshift of a transmission connected to the crankshaft of the internal combustion engine is in a D range for driving, in comparison with in a P range for stopping.

* * * * *